US009027875B2

(12) United States Patent
West (10) Patent No.: US 9,027,875 B2
(45) Date of Patent: May 12, 2015

(54) PYLON ARRANGEMENT FOR OPEN STRUCTURE (75) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 559 days.

(21) Appl. No.: 13/284,493

(22) Filed: Oct. 28, 2011

(65) Prior Publication Data

US 2012/0104162 A1 May 3, 2012

Related U.S. Application Data (60) Provisional application No. 61/407,491, filed on Oct. 28, 2010.

(51) Int. Cl.
*B64D 27/26* (2006.01)
*B64D 27/18* (2006.01)
*B64C 1/14* (2006.01)

(52) U.S. Cl.
CPC .............. *B64D 27/18* (2013.01); *B64C 1/1453* (2013.01); *B64D 27/26* (2013.01)

(58) Field of Classification Search
CPC .................... B64D 27/26; B64D 2027/264
USPC .............. 244/54, 53 R; 60/796–798; 248/554
See application file for complete search history.

(56) References Cited

U.S. PATENT DOCUMENTS

| | | | | |
|---|---|---|---|---|
| 3,327,965 | A | | 6/1967 | Bockrath |
| 3,357,657 | A | * | 12/1967 | Ferrel et al. ...................... 244/54 |
| 4,026,105 | A | * | 5/1977 | James ............................ 60/226.2 |
| 4,044,973 | A | * | 8/1977 | Moorehead ....................... 244/54 |
| 4,560,122 | A | * | 12/1985 | Parkinson et al. ................ 244/54 |
| 4,725,019 | A | * | 2/1988 | White ............................. 244/54 |
| 5,174,110 | A | * | 12/1992 | Duesler et al. ............... 60/226.1 |
| 5,779,191 | A | | 7/1998 | Brislawn |
| 6,095,456 | A | * | 8/2000 | Powell ............................ 244/54 |
| 6,126,110 | A | * | 10/2000 | Seaquist et al. ................. 244/54 |
| 6,138,949 | A | * | 10/2000 | Manende et al. ........... 244/17.27 |
| 6,398,161 | B1 | * | 6/2002 | Jule et al. ........................ 244/54 |
| 6,802,479 | B2 | * | 10/2004 | Howe et al. ................. 244/129.1 |
| 7,296,768 | B2 | * | 11/2007 | Machado et al. ................ 244/54 |
| 8,205,825 | B2 | * | 6/2012 | Huggins et al. ................. 244/54 |
| 2003/0213871 | A1 | * | 11/2003 | Howe et al. ................. 244/129.1 |
| 2005/0178889 | A1 | * | 8/2005 | Machado et al. ................ 244/54 |
| 2008/0169377 | A1 | * | 7/2008 | Levert ............................. 244/54 |
| 2008/0191088 | A1 | | 8/2008 | Diochon et al. |
| 2008/0217502 | A1 | * | 9/2008 | Lafont ........................... 248/554 |
| 2008/0251634 | A1 | * | 10/2008 | Bernardi et al. ................ 244/54 |
| 2009/0212155 | A1 | | 8/2009 | Huggins et al. |
| 2011/0120075 | A1 | | 5/2011 | Diaz et al. |
| 2011/0121132 | A1 | | 5/2011 | Crook et al. |
| 2011/0204179 | A1 | * | 8/2011 | Skelly et al. .................... 244/54 |

* cited by examiner

*Primary Examiner* — Justin Benedik

(74) *Attorney, Agent, or Firm* — Hovey Williams LLP (57) ABSTRACT

An aircraft pylon is disclosed, the pylon including a strut, a modular fluid containment structure and a modular firewall. The strut presents an open structure and connects an aircraft external element to the aircraft. The fluid containment structure is associated with a fluid transfer component, wherein the fluid containment structure contains escaped fluid from the fluid transfer component and channels the escaped fluid away from the aircraft. Both the fluid containment component and the firewall are modular and separable from the strut.

21 Claims, 11 Drawing Sheets

PYLON ARRANGEMENT FOR OPEN STRUCTURE

RELATED APPLICATIONS

This non-provisional patent application claims priority benefit with regard to all common subject matter of earlier-filed U.S. provisional patent application titled PYLON ARRANGEMENT FOR OPEN STRUCTURE, filed Oct. 28, 2010, and assigned application No. 61/407,491. The earlier-filed application is hereby incorporated by reference in its entirety into the present application.

BACKGROUND

Embodiments of the present invention relate to pylons that couple an externally attached component to an aircraft wing or fuselage. More particularly, embodiments of the present invention relate to aircraft pylons presenting an open structure with modular fire, vapor and fluid barrier components.

An aircraft pylon secures an aircraft engine, typically a high-bypass engine, to an aircraft wing or fuselage. The pylon performs a number of critical functions such as supporting the engine, fairings and systems, providing a fire and vapor barrier between the engine and the wing or fuselage, transmitting the engine thrust to the airplane, supporting the engine nacelle and thrust reverser in the optimum aerodynamic location, and the like.

A typical pylon may include nearly a hundred parts, which may be held together by thousands of fasteners. Assembling the pylon may involve drilling hundreds of holes for coupling the parts together as well as applying extensive corrosion protection and sealing joints and fasteners. The strength of the materials required for the pylon may make the drilling process difficult and time consuming. Furthermore, the use of mechanical fasteners may require considerable overlapping of the joining surfaces which adds to the overall weight and cost of the pylon. Thus, the production of aircraft engine pylons from a large number of joined-together components is time and labor intensive with a high part count and corresponding high cost.

Airplane pylons constructed according to traditional techniques present other limitations as well. For example, inspection of such pylons may be difficult or expensive, and repairs may be costly as damage to one part of the pylon may affect other parts, and require replacement of most or all of the pylon.

One approach to alleviate some of these problems involves using an open type of pylon primary structure, such as a space frame or truss, which eliminates some of the problems outlined above, such as the need for extensive drilling and fastening. However, such open structures do not provide the fire protection and fluid containment functions provide by traditional, closed pylon structures.

Accordingly, there is a need for a device which overcomes the limitations described above.

SUMMARY

An aircraft pylon in accordance with a first embodiment of the invention comprises a strut for connecting an aircraft external element to the aircraft, the strut presenting an open structure, and a fluid transfer component extending from the aircraft to the aircraft external element. A fluid containment structure is associated with the fluid transfer component, wherein the fluid containment structure contains escaped fluid from the fluid transfer component and channels the escaped fluid away from the aircraft, and wherein the fluid containment structure is modular and separable from the strut.

An aircraft pylon in accordance with a second embodiment of the invention comprises a strut for connecting an aircraft external element to the aircraft, the strut presenting an open structure, and a fire barrier component interposed between the strut and the aircraft external element, at least a portion of the fire barrier component being modular and separable from the strut.

An aircraft engine pylon in accordance with a third embodiment of the invention comprises a strut for connecting an aircraft engine to the aircraft structure, the strut presenting a truss structure, and a plurality of fluid transfer components extending from the aircraft structure to the aircraft engine. A fluid containment structure is associated with the fluid transfer component and supported by the strut, wherein the fluid containment structure contains escaped fluid from the fluid transfer component and channels the escaped fluid away from a flammable zone of the aircraft engine. The fluid containment structure includes a shroud portion proximate the aircraft engine and a sink portion proximate the aircraft structure, the sink portion corresponding to an area where the plurality of the fluid transfer components connect to the aircraft wing. The fluid containment structure includes at least one drain for allowing the escaped fluid to exit the aircraft away from the flammable zone of the aircraft engine. A fire barrier component is interposed between the strut and the aircraft engine, at least a portion of the fire barrier component being modular and separable from the strut.

A fire barrier system in accordance with a fourth embodiment of the invention comprises a first fire barrier element on a first component of a thrust reverser of the engine and a second fire barrier element on a second component of the thrust reverser of the engine. A third fire barrier element is positioned proximate a mount structure for mounting the engine onto a pylon. Each of the elements is arranged such that when the thrust reverser is in a closed position, the first fire barrier element, the second fire barrier element, and the third fire barrier element cooperate to form a firewall between the engine and the pylon.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawings, and in particular to FIGS. 1-4, an aircraft pylon constructed according to a first exemplary embodiment of the present invention is illustrated and identified generally as reference numeral 10. The pylon 10 secures an engine 12 or other external aircraft element to an aircraft 14 and is constructed according to an open structural configuration and includes modular elements for providing fire protection and fluid containment. In particular, the pylon 10 includes a strut 16, a fluid containment structure 18 at least partially extending between the engine 12 and the aircraft 14, and a firewall 20 generally positioned between the strut 16 and the engine 12.

Figure 1:
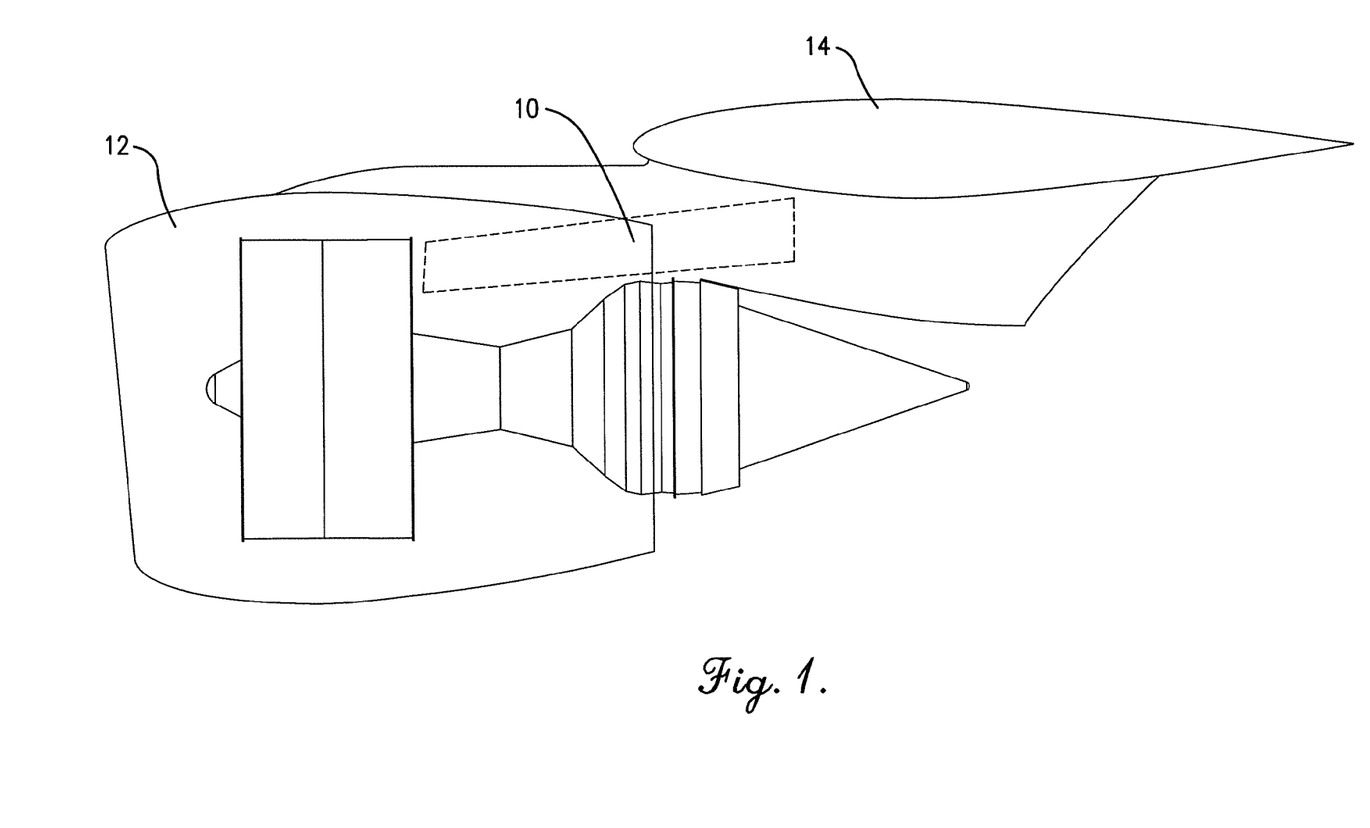
FIG. 1 is a schematic diagram of an aircraft pylon constructed according to a first embodiment of the invention, the aircraft pylon shown attached to an aircraft engine according to a core mount configuration.
Figure 2:
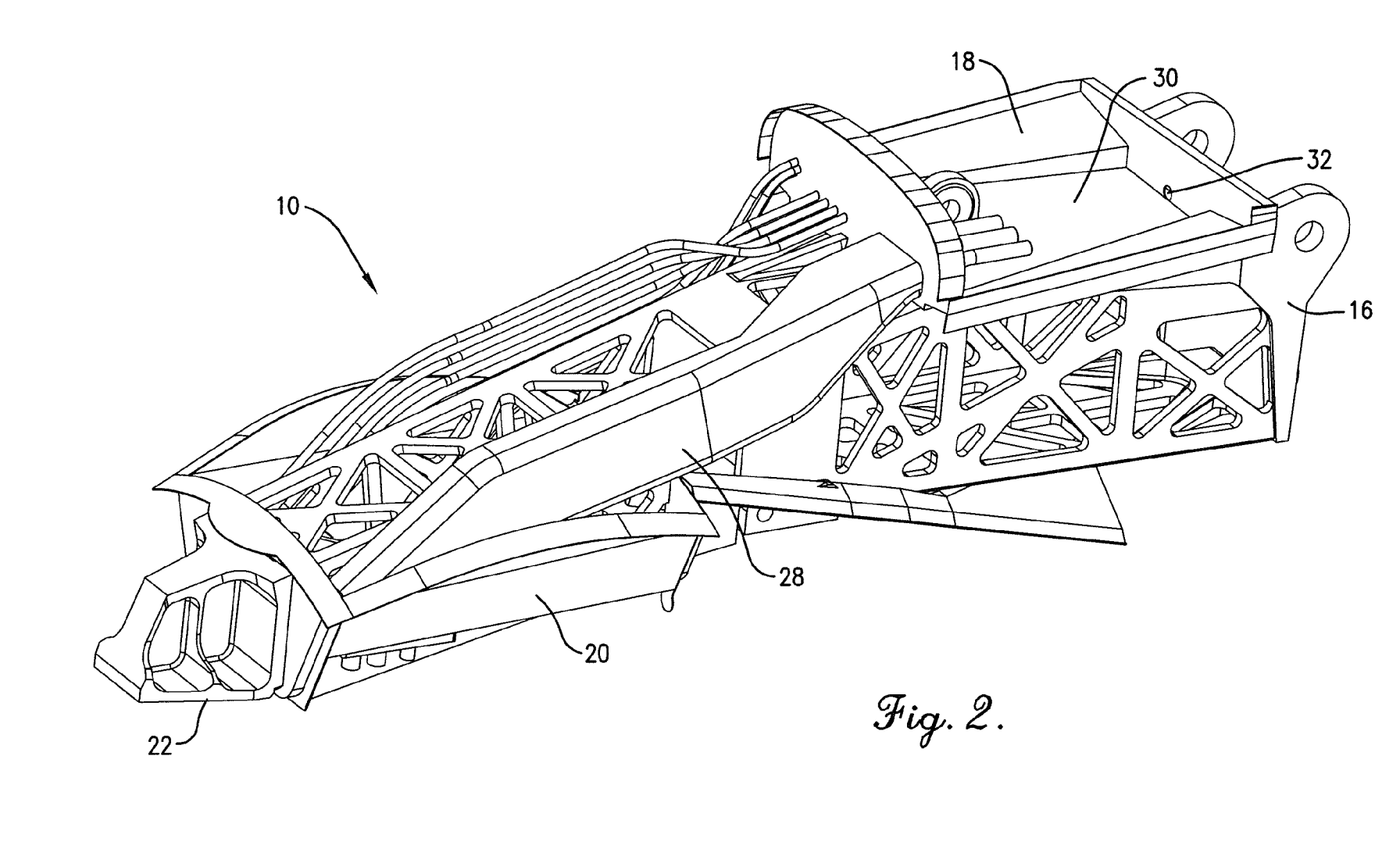
FIG. 2 is a perspective view of various elements of the aircraft pylon of FIG. 1, including a strut, a fluid containment structure, and a firewall.

The strut 16 provides the primary structural support for the pylon 10 and presents an open configuration. In the illustrated embodiment, the strut 16 presents a truss or space frame structural configuration comprising a plurality of structural members integrally interconnected. The illustrated strut 16 is secured at one end to a portion of the aircraft 14, such as a wing or fuselage, and is secured at the other end to the external aircraft element, such as the engine 12 depicted in the drawings. As illustrated in FIG. 1, the illustrated strut 16 presents a core mount configuration wherein a forward attachment area 22 of the strut 16 attaches to the engine 12 within the nacelle core cowl compartment in a conventional manner. An aft attachment area 24, including a plurality of lugs or other attachment means 26, attaches to the aircraft 14 in a conventional manner.

The fluid containment structure 18 is associated with one or more fluid transfer components that carry fluid between the aircraft 14 and the engine 12, such as hoses or tubing and related connection elements, and provides a barrier that contains any fluids that escape from the fluid transfer components and channels the escaped fluids safely away from danger zones associated with the aircraft 14 or with the external aircraft element, such as fire zones in and around the engine 12. Escaped fluids may originate from leaks in intermediate connections or from holes that form in the walls of the fluid transfer components. By way of example, the fluid transfer components may extend from connectors on a wing of the aircraft 14 to service disconnects located on the engine 12, and may carry flammable fluids such as fuel or hydraulic fluid.

Figure 3:
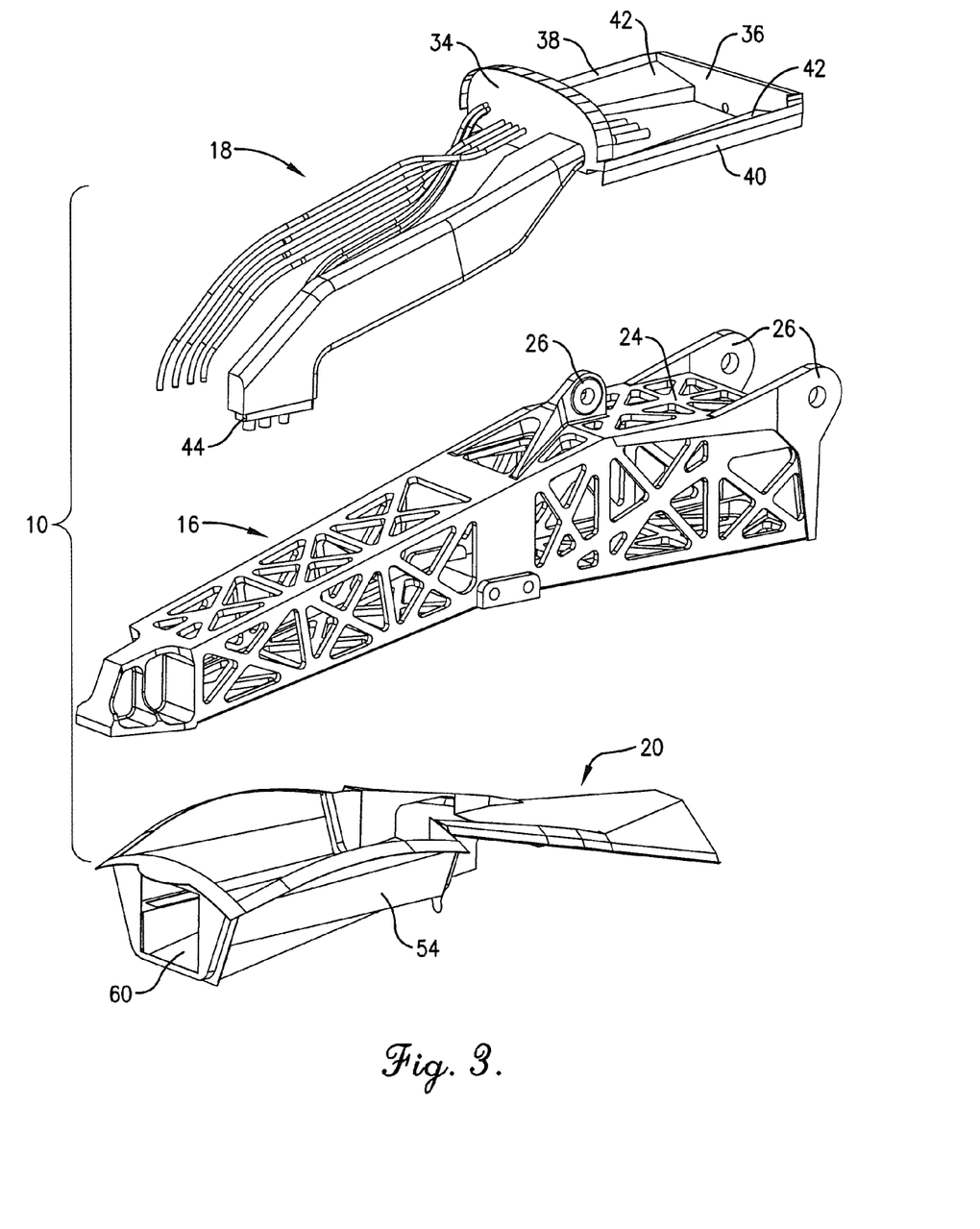
FIG. 3 is an exploded perspective view of the aircraft pylon components of FIG. 2.
Figure 4:
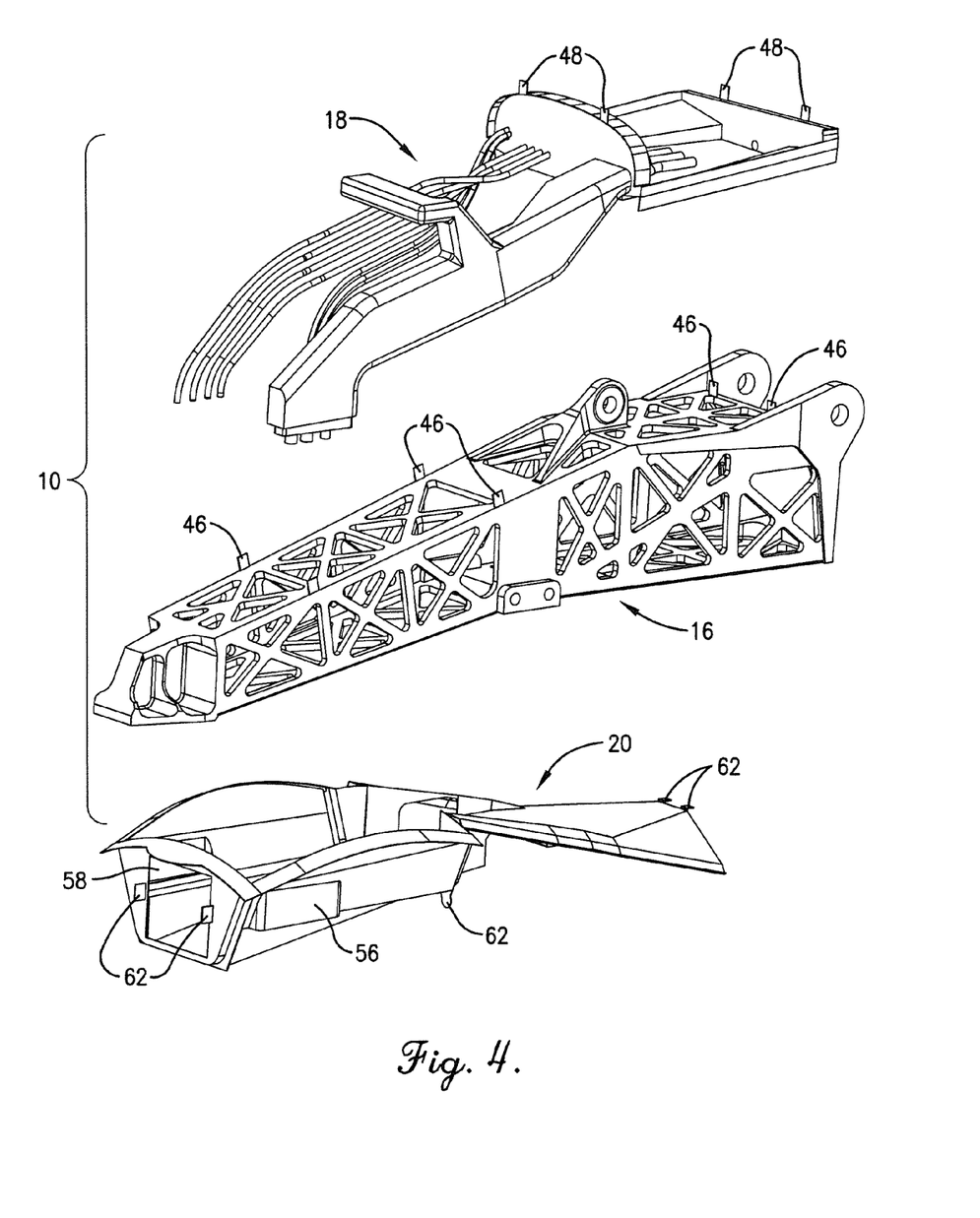
FIG. 4 is an exploded perspective view of the aircraft pylon components of FIG. 2, depicting an alternative configuration including a branch of the fluid containment structure to accommodate divergent fluid transfer components and a plurality of interface elements integrally formed in various components of the pylon.

The fluid containment structure 18 is preferably modular and structurally independent of the truss 16, as illustrated in FIGS. 3-4. As used herein, "modular" means an element or component is separable from, and can be replaced and repaired independently of, the remainder of the system or pylon. By way of example, the fluid containment structure 18 attaches to, but is not part of, the truss 16. Thus, if the fluid containment structure 18 needs to be repaired or replaced, it can be removed from the truss 16 without removing the truss 16 from the aircraft 14.

The illustrated fluid containment structure 18 includes two portions, a forward portion 28 (also referred to herein as the "shroud") and an aft portion 30 (also referred to herein as the "sink"). The forward portion 28 is generally enclosed while the aft portion 30 may present an open structure to accommodate a complex systems routing configuration associated with a transition zone between the pylon 10 and the aircraft 14. The transition zone may involve a plurality of fluid and electrical routings connected to the aircraft 14, such as a wing front spar, which may cover a wide profile and be difficult or impossible to completely encase with the fluid containment structure 18. The aft portion 30 of the illustrated fluid containment structure addresses these challenges by presenting a sink configuration for catching escaped fluids. The sink 30 presents a relatively wide profile and may contain one or more drains 32 for allowing the escaped fluids to exit the fluid containment structure 18 and the aircraft 14 along a route that avoids any danger zones.

The sink 30 is preferably of monolithic construction and includes a front wall 34, a rear wall 36, first 38 and second 40 side walls, and lateral elevated portions 42 adjacent the side walls 36,38 that help contain and channel any escaped fluids that are contained therein. The front wall 34 provides a forward fluid barrier. A top surface of the front wall, outer surfaces of the side walls, and an outer surface of the back wall may at least partially engage fairing panels (not illustrated) of the pylon 10 to create a substantially fluid-tight fluid containment volume. The monolithic construction of the sink 30 minimizes or eliminates the need for seams, thus facilitating construction and ensuring that the sink 30 is fluid-tight.

The sink 30 may be configured such that fluids contained therein tend toward one or more drains, such as the drain 32, thus avoiding pooling of the fluids. By way of example, top surfaces of the lateral elevated portions 42 may slope inward, the floor may slope rearward, and the lateral elevated portions 42 may be wider proximate the rear wall 36, thus urging fluids in the sink 30 toward the middle and the back of the sink 30, where one or more drains may be located. The side walls 38,40 and elevated lateral portions 42 allow the sink 30 to catch and contain fluids when the aircraft 14 is in various positions, such as when the aircraft 14 is banking.

One or more drains, such as the drain 32, may be positioned at or near a center of the sink 30 near the back wall 36 to allow safe exit of fluids that concentrate in that area due to the rearward slope of the sink 30 floor and inward and/or rearward slope of the elevated lateral portions 42. Alternatively or additionally, one or more drains may be positioned at other locations in the sink, such as in one or more corners. Each of the drains may include an associated escape tube (not illustrated) that safely route the fluid toward the outside of the aircraft 14. Furthermore, in some embodiments of the invention, the sink 30 may not include a drain, but the fluid containment structure 18 may be configured such that any fluid collected in the sink 30 may drain through the forward portion 28 of the fluid containment structure 18.

The forward portion 28 of the fluid containment structure 18 is an enclosed compartment or shroud that encases the fluid transfer components between the sink 30 and the engine 12. A fireproof seal 44 may connect the shroud to a portion of the engine 12, such as the engine nacelle, to accommodate relative movement between the pylon 10 and the engine 12 without sacrificing fluid containment properties. The fluid transfer components pass through, and are encased by, the shroud 28. One or more drains and associated escape tubes may be included in the shroud 28, such as at a forward end of the shroud 28 or at an intermediate point along the shroud 28. Thus, if fluid escapes from a fluid transfer component inside the shroud 28, it follows the shroud 28 toward either end of the shroud 28 where it flows through a drain and safely exits the pylon 10 and the aircraft 14.

In the illustrated embodiment, the sink 30 is positioned on top of the strut 16 at or near the aft attachment area 24, and the shroud 28 follows a side of the strut 16 toward an aperture in the firewall 20, as explained below in greater detail. As illustrated in FIG. 4, one or more interface elements 46 may be integrally formed in the strut 16, in the fluid containment structure 18, or both for attaching the fluid containment structure 18 to the strut 16 and supporting the fluid containment structure 18 relative to the strut 16. Similarly, interface elements 48 may be integrally formed in the fluid containment structure 18 for attaching to other pylon elements, such as fairing panels.

The sink 30 may include apertures 50 for allowing structural elements, such as one or more of the strut lugs 26, and systems components, such as electrical wires and fluid transfer components, to pass through one or more walls of the sink 30. Such apertures 50 are preferably positioned to minimize interference with fluid flow in the sink, and are preferably raised and/or sealed to prevent fluid leaks.

As illustrated in FIG. 4, one or more branches may be included in the shroud 28 to accommodate divergent fluid transfer components. For example, a branch 52 may be included for housing one or more fluid transfer elements to an engine fan case carrying hydraulic fluid used to actuate hydraulic equipment located on the engine fan case, such as a thrust reverser.

The firewall 20 provides a fire and heat barrier between the engine 12 and the other components of the pylon 10 and the aircraft 14. As such, the firewall 20 is constructed of appropriate heat and flame resistant material and is positioned between the engine 12 and the other pylon components and may be, for example, positioned between the strut 16 and the engine 12. In the illustrated embodiment, the firewall 20 is configured to fit snugly with, and generally conform to, a bottom portion of the strut 16. A forward portion 54 of the firewall 20 forms a tub or basin that receives a corresponding portion of the strut 16.

A first lateral recess 56 and corresponding downward-opening aperture allows for fluid transfer components to pass between the strut 16 and the firewall 20 and through a bottom of the firewall 20, while a second lateral recess 58 and corresponding downward-opening aperture allows for electrical components to pass between the strut 16 and the firewall 20 and through a bottom of the firewall. As illustrated in FIGS. 3 and 4, an end of the shroud 28 is configured to fit within the first recess 56 such that fluid transfer components passing through the shroud 28 pass through the aperture associated with the recess 56. Electrical components may follow a side of the strut 16 opposite the shroud 28 and pass through the second recess 58 and aperture. An end aperture 60 receives an end portion of the truss 16. Interface elements may be integrally formed in the strut, in the firewall, or both for attaching the firewall to the strut and supporting the firewall relative to the strut. By way of example, FIG. 4 illustrates a plurality of flanges 62 integrally formed on the firewall 20 for attaching to the strut 16.

Figure 5:
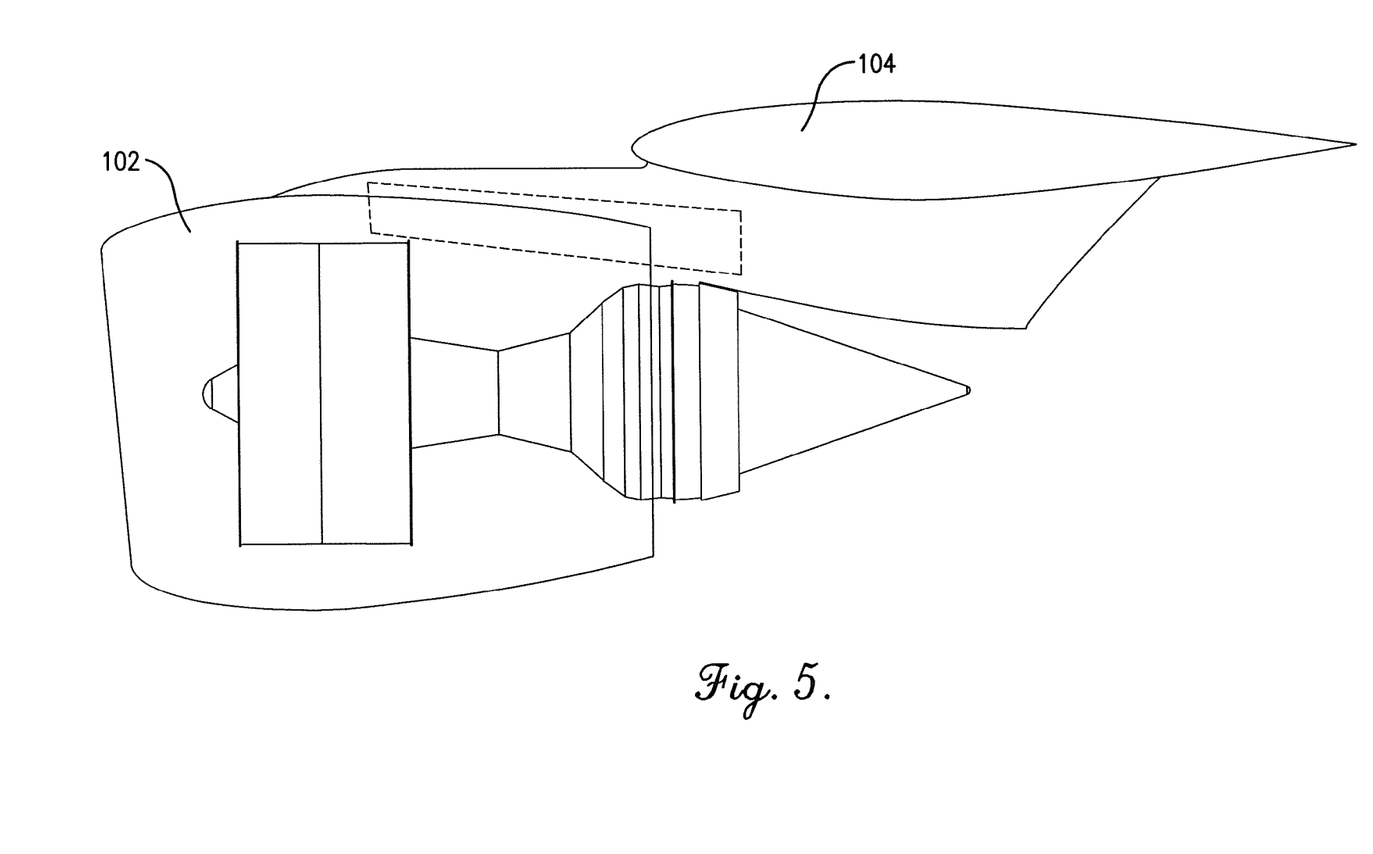
FIG. 5 is a schematic diagram of an aircraft pylon constructed according to a third embodiment of the invention, the aircraft pylon shown attached to an aircraft engine according to a fan case mount configuration.

FIGS. 5-8 illustrate an aircraft pylon 100 constructed according to a second embodiment of the invention. The pylon 100 is particularly adapted for fan case mounting, positioned generally as illustrated in FIG. 5. The pylon 100 secures an engine 102 or other external aircraft element to an aircraft 104 and is constructed according to an open structural configuration and includes modular components for providing fire protection and fluid containment. In particular, the pylon 100 includes a strut 106, a fluid containment and systems support structure 108 extending at least partially between the engine 102 and the aircraft 104, and a firewall 110 generally positioned between the strut 106 and the engine 104.

Figure 7:
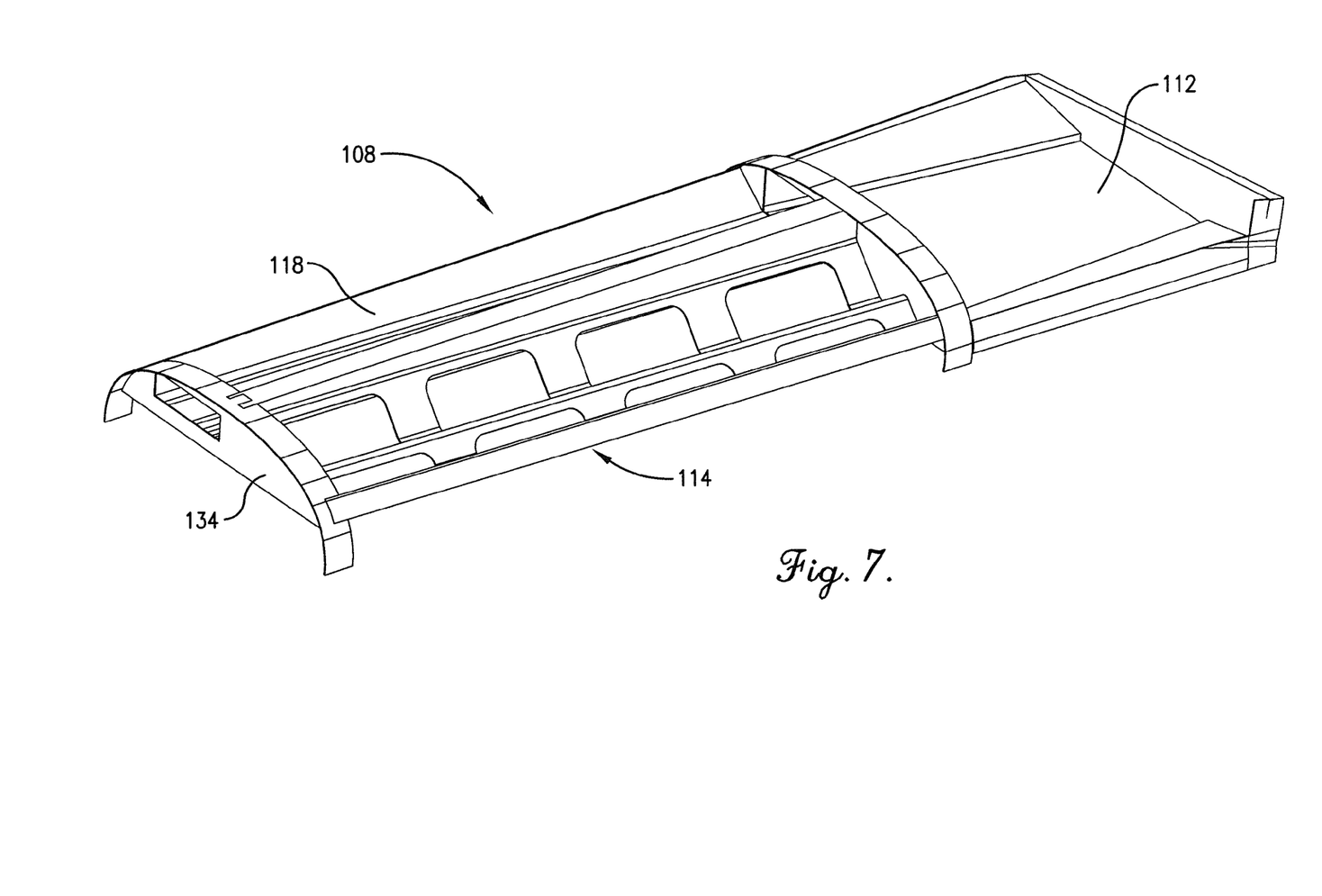
FIG. 7 is a perspective view of the fluid containment and systems support structure of the aircraft pylon of FIG. 6.
Figure 8:
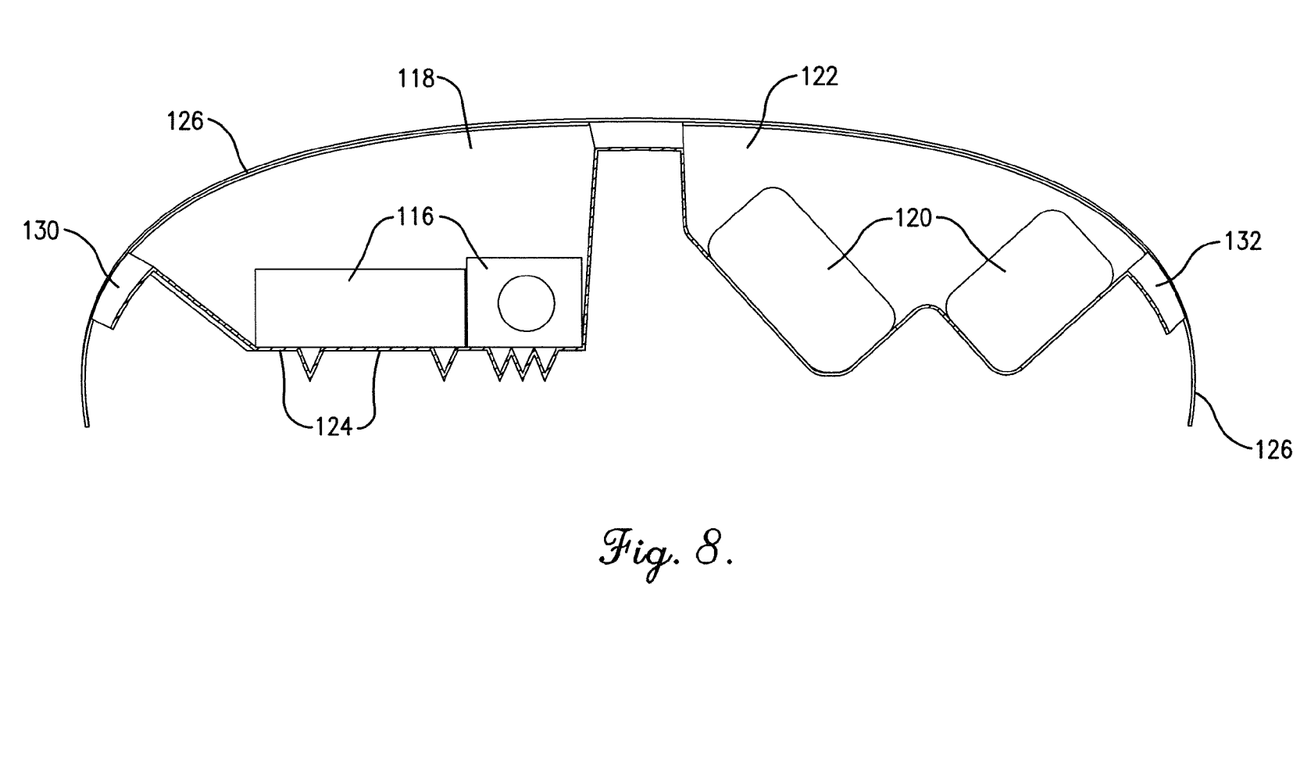
FIG. 8 is a cross-sectional view of the fluid containment and systems support structure of the aircraft pylon of FIG. 6, illustrating fluid transfer components and electrical systems components in a systems and support section of the structure.

FIGS. 7 and 8 illustrate the fluid containment and systems support structure 108, which includes a sink 112 similar in design and function to the sink 30 described above, and a systems support section 114 positioned forward of the sink 112. The sink 112 interfaces with one or more fairing panels to create a fluid containment volume. The systems support section 114 provides support and containment for fluid transfer components 116 routed along a first side 118 thereof, and support for electrical systems 120 routed along a second side 122 thereof. The first side 118 includes solid bottom and side walls 124 that interface with inside surfaces of pylon fairing panels 126 to create a fluid containment volume that houses the fluid transfer components 120. A lateral shroud 128 may depend from the first side 118 to provide fluid containment for one or more fluid transfer components 116 routed downwardly from the first side 118 of the fluid containment and systems support structure 108 toward the engine 102.

Figure 6:
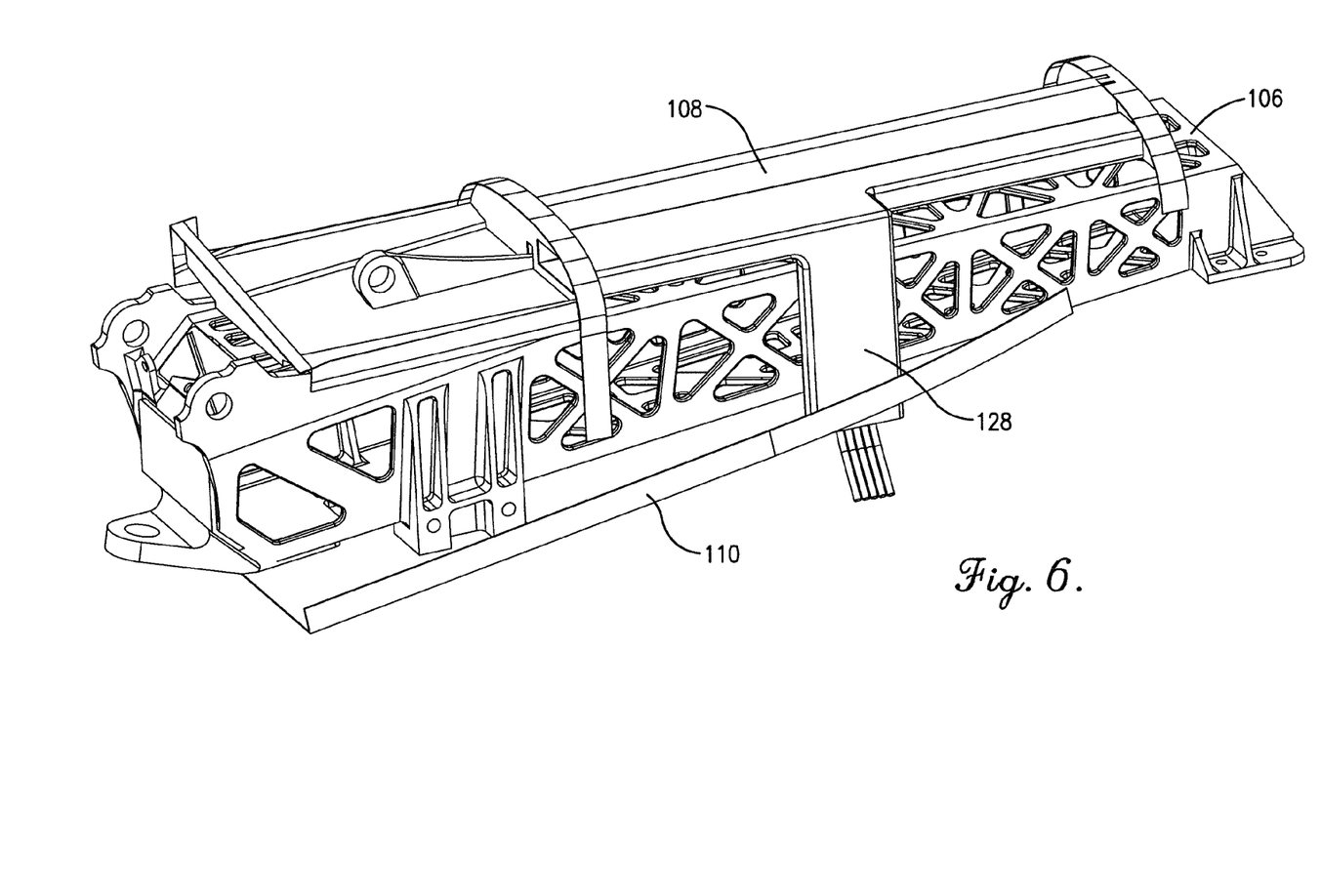
FIG. 6 is a perspective view of various elements of the aircraft pylon of FIG. 5, including a strut, a fluid containment and systems support structure, and a firewall.

In the illustrated embodiment, the fluid containment and systems support structure 108 is positioned on top of the strut 106, as illustrated in FIG. 6, and may include interface and attachment elements for attaching to the strut 106 and supporting the structure 108 relative to the strut 106. The structure 108 may also include interface and attachment elements for attaching to one or more fairing panels and supporting the fairing panels. Such interface and attachment elements are preferably integrally formed in the structure 108 and/or the strut 106. Various elements of the fluid containment and systems support structure 108 may engage and/or support one or more of the pylon fairings 126, such as outer surfaces of the side walls of the sink, a top edge of the front wall of the sink, outer surfaces 130,132 of side walls of the first 118 and second 122 sides of the systems support section 114, and a top edge of a front wall 134 of the systems support section 114.

Figure 9A:
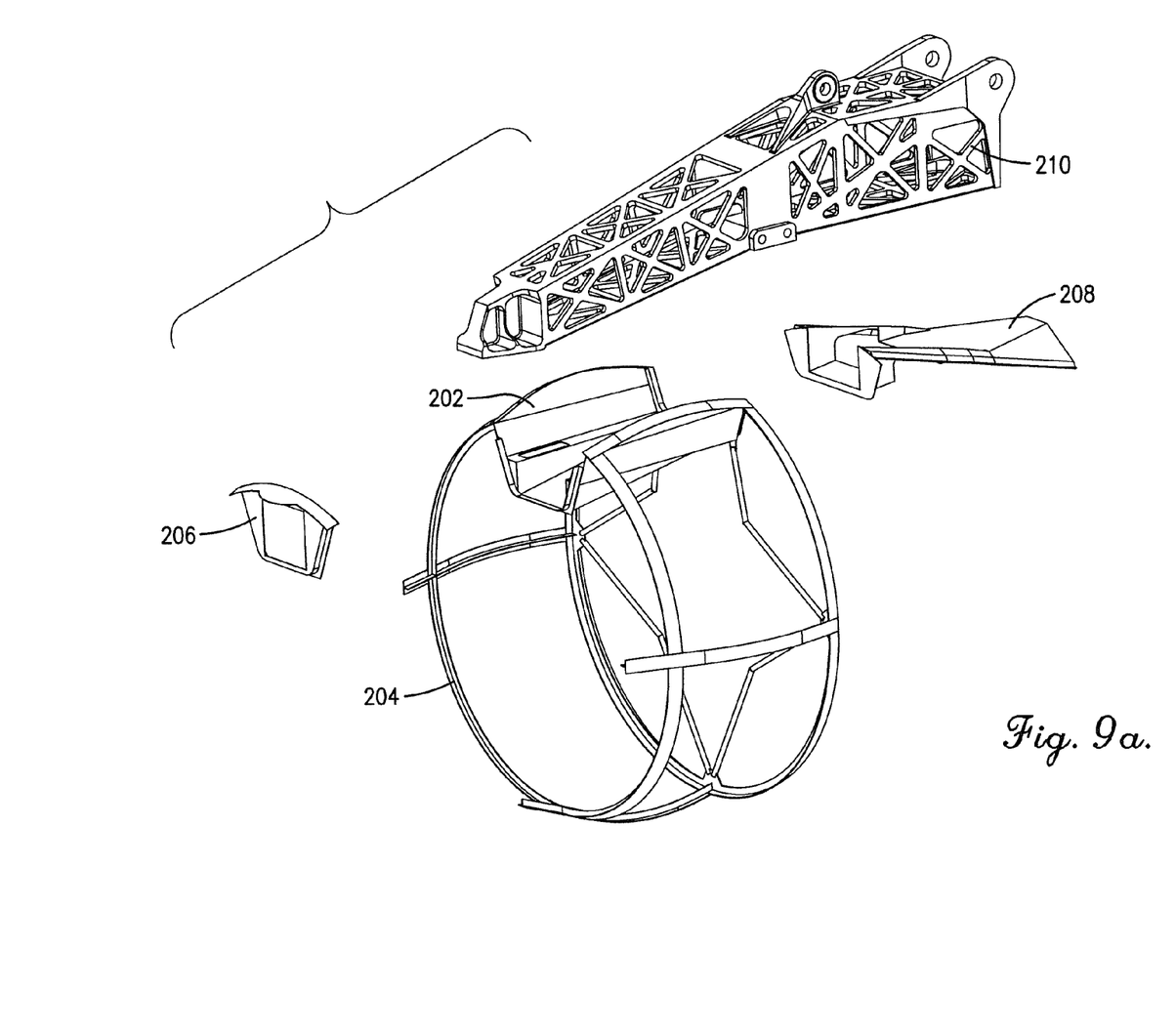
FIG. 9a is an exploded perspective view of an aircraft pylon constructed according to a fourth embodiment of the invention, including a firewall with modular portions and a portion that is integral with a structure of the aircraft.
Figure 9B:
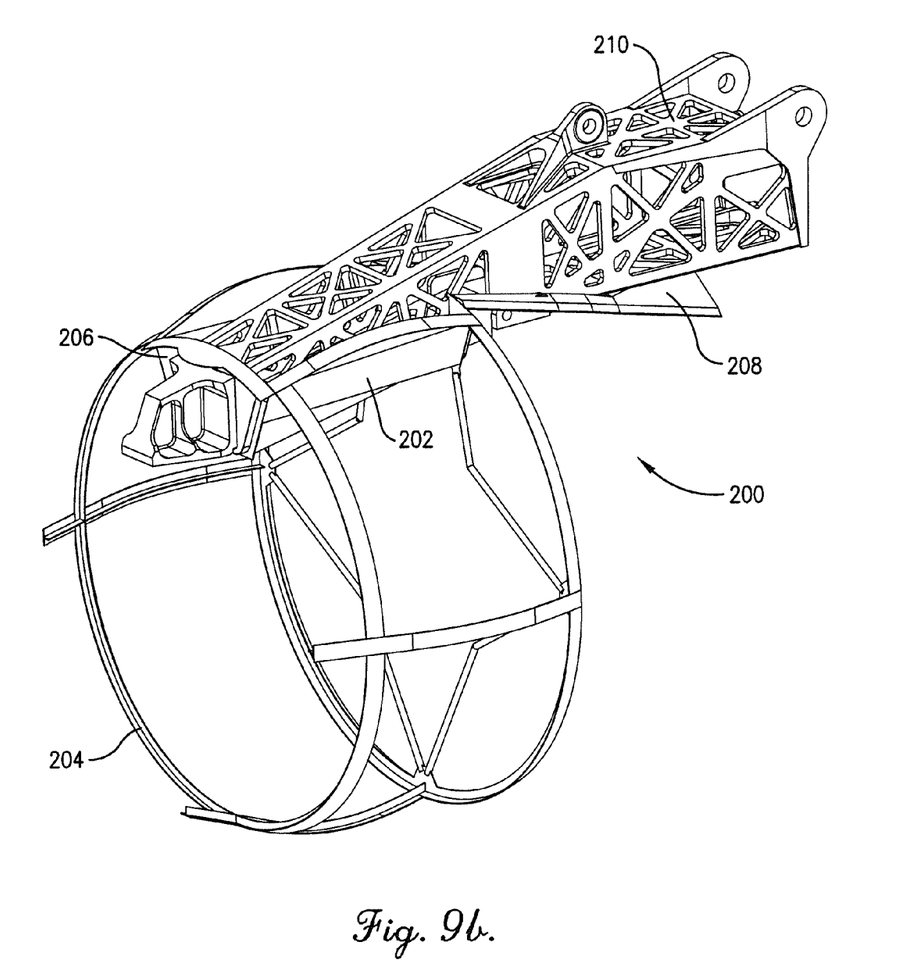
FIG. 9b is a perspective view of the pylon of FIG. 9a illustrating the truss and the firewall components assembled.

FIGS. 9a and 9b depict certain components of another embodiment of the invention comprising an aircraft pylon 200 similar to the pylon 10 described above, except a portion of the firewall forms part of the engine structure. More particularly, a mid portion 202 of the firewall is integrally formed as part of an engine nacelle structural element 204, while a forward portion 206 and an aft portion 208 of the firewall are each modular and structurally independent. When the pylon 200 is assembled, the aft portion 208, mid portion 202 and forward portion 206 of the firewall cooperate to perform substantially the same function as the firewall 20, described above. The mid portion 202 of the firewall forms a tub or basin that receives a forward portion of the strut 210, in a manner similar to the firewall described above. Although not illustrated in FIGS. 9a and 9b, the pylon 200 may also include other components and elements associated with the pylon 10 and described above, such as the fluid containment structure 18 and the interface elements 46 and 48, or equivalents thereof.

Figure 10A:
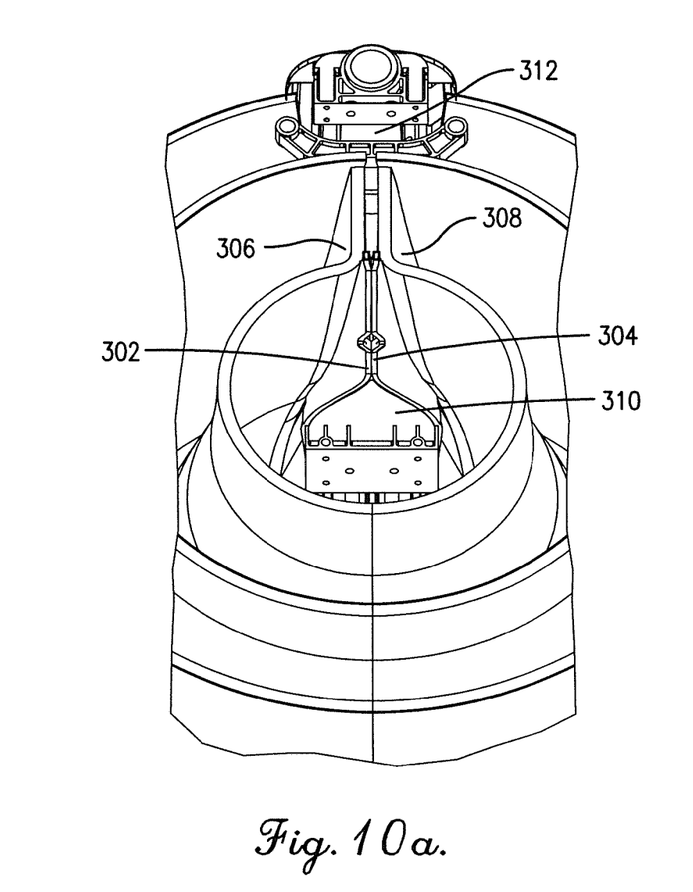
FIG. 10a is a perspective view of fire barrier system constructed according to fifth embodiment of the invention, including fire barrier elements positioned on portions of the thrust reverser and on a pylon structural attachment component, the thrust reverser being in a closed position.
Figure 10B:
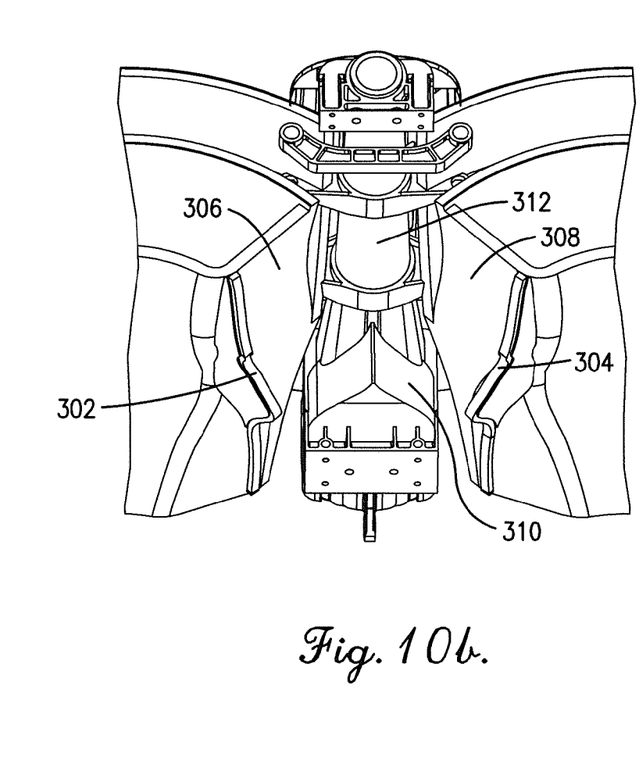
FIG. 10b is a perspective view of the fire barrier system of FIG. 10a, illustrating the thrust reverser in an open position.

FIGS. 10a and 10b depict yet another embodiment of the invention including a fire barrier system 300 for an aircraft engine that includes lowered fire barrier elements. More particularly, a first fire barrier element 302 and a second fire barrier element 304 are both placed on components 306,308 of an engine thrust reverser. A third fire barrier element 310 is secured to and surrounds a mount structure that secures the engine to the pylon. When the thrust reverser is in a closed position (e.g., as illustrated in FIG. 10a), the first and second elements 302,304 are in contact with each other and with the third fire barrier element 310 to form a firewall between the engine and the pylon 312. When the thrust reverser is in an open position (e.g., as illustrated in FIG. 10b), the first and second elements 302,304 are separated and expose at least a portion of the pylon 312 proximate the engine, thus facilitating inspection of the pylon 312.

Although the invention has been described with reference to the exemplary embodiments illustrated in the attached drawings, it is noted that equivalents may be employed and substitutions made herein without departing from the scope of the invention as recited in the claims. For example, while the pylon is shown in the figures and described herein as being configured to secure the aircraft engine to the aircraft wing, embodiments of the present invention may secure an externally mounted system, such as a fuel tank, a sensor pod, an expendable ordnance, or the like, to the aircraft wing or aircraft fuselage. Similarly, while some of the embodiments of the invention have been described and illustrated herein as including struts presenting open or truss configurations, it will be appreciated that the invention is not so limited and that other strut or pylon configurations may be used without departing from the spirit and scope of the present invention. By way of example, the present invention may be used with pylons constructed of non-traditional materials, such as composites, or with pylons that employ shapes that are not conducive to fluid containment or to fire protection.

Having thus described various embodiments of the invention, what is claimed as new and desired to be protected by Letters Patent includes the following:

1. An aircraft pylon comprising:
   a strut for connecting an aircraft external element to the aircraft;
   a plurality of fluid transfer components extending from the aircraft to the aircraft external element; and
   a fluid containment structure associated with the fluid transfer components, the fluid containment structure including a sink structure positioned in an aft portion of the fluid containment structure and a shroud structure positioned in a forward portion of the fluid containment structure,
   the sink structure including a forward wall, an opposing aft wall, a bottom wall, and opposing side walls positioned between the forward wall and the aft wall, the forward wall including a plurality of openings for the fluid transfer components to pass therethrough, the side walls being angled downward from side edges toward the bottom wall to channel fluid onto the bottom wall, and
   the shroud structure attached to the forward wall of the sink structure and including left and right sidewalls, a top wall, and a bottom wall that completely enclose at least a portion of the fluid transfer components, the shroud portion coupled to the forward wall of the sink portion and extending forward therefrom to the aircraft external element.

2. The aircraft pylon as set forth in claim 1, the strut presenting an open structure.

3. The aircraft pylon as set forth in claim 1, the fluid containment structure being supported by the strut.

4. The aircraft pylon as set forth in claim 1, wherein the sink portion cooperates with at least one pylon fairing panel to create an enclosed fluid containment volume.

5. The aircraft pylon as set forth in claim 1, the sink portion including a drain and configured to catch at least a portion of the escaped fluid and presenting at least one angled surface to channel the escaped fluid toward the drain.

6. The aircraft pylon as set forth in claim 1, the fluid containment structure including a drain for allowing the escaped fluid to exit the pylon away from a danger zone of the aircraft external element.

7. The aircraft pylon as set forth in claim 1, the fluid containment structure including a first attachment element for attaching the fluid containment structure to the strut, the first attachment element being integrally formed in the fluid containment structure.

8. The aircraft pylon as set forth in claim 7, the fluid containment structure including a second attachment element for attaching to at least one fairing, the second attachment element being integrally formed in the fluid containment structure.

9. The aircraft pylon as set forth in claim 1, wherein the strut presents a truss structure.

10. The aircraft pylon as set forth in claim 1, wherein the aircraft external element is an engine.

11. The aircraft pylon as set forth in claim 1, further comprising a fire barrier component interposed between the strut and the aircraft external element, the fire barrier component being modular and separable from the strut.

12. An aircraft pylon comprising:
a strut for connecting an aircraft external element to the aircraft, the strut presenting an open structure; and
a fire barrier component interposed between the strut and the aircraft external element, at least a portion of the fire barrier component being modular and separable from the strut, the fire barrier operable to provide a barrier between an aircraft engine and the strut, the fire barrier including an aft portion with a planar upper surface contacting a lower wall of the strut and a forward portion with a lower wall, a left sidewall, and a right sidewall whose inner surfaces face at least a portion of the outer surfaces of the lower wall, a left sidewall, and a right sidewall, respectively, of the strut.

13. The aircraft pylon of claim 12, the fire barrier component including attachment elements integrally formed therein for attaching the fire barrier component to the strut.

14. The aircraft pylon of claim 12, a first portion of the fire barrier forming part of the external element structure, and a second portion of the fire barrier being modular and separable from the strut and from the external element.

15. The aircraft pylon of claim 14, the aircraft external element including an engine, and the first portion of the fire barrier being integrally formed with a portion of a nacelle associated with the engine.

16. An aircraft engine pylon comprising:
a strut for connecting an aircraft engine to an aircraft structure, the strut presenting a truss structure;
a plurality of fluid transfer components extending from the aircraft structure to the aircraft engine;
a fluid containment structure associated with the fluid transfer components, the fluid containment structure including a sink structure positioned in an aft portion of the fluid containment structure and a shroud structure positioned in a forward portion of the fluid containment structure,
the sink structure including a forward wall, an opposing aft wall, a bottom wall, and opposing side walls positioned between the forward wall and the aft wall, the forward wall including a plurality of openings for the fluid transfer components to pass therethrough, the side walls being angled downward from side edges toward the bottom wall to channel fluid onto the bottom wall, and
the shroud structure including left and right sidewalls, a top wall, and a bottom wall that completely enclose at least a portion of the fluid transfer components, the shroud portion coupled to the forward wall of the sink portion and extending forward therefrom to the aircraft external element; and a fire barrier component interposed between the strut and the aircraft external element, at least a portion of the fire barrier component being modular and separable from the strut, the fire barrier operable to provide a barrier between an aircraft engine and the strut, the fire barrier including an aft portion with a planar upper surface contacting a lower wall of the strut and a forward portion with a lower wall, a left sidewall, and a right sidewall whose inner surfaces face at least a portion of the outer surfaces of the lower wall, a left sidewall, and a right sidewall, respectively, of the strut.

17. The aircraft engine pylon of claim 16, the fluid containment structure including a plurality of attachment elements for attaching the fluid containment structure to the strut, the attachment elements being integrally formed with the fluid containment structure.

18. The aircraft engine pylon of claim 16, the fluid containment structure including a plurality of attachment elements for attaching to one or more fairing panels.

19. A fire barrier system for an aircraft engine, the system comprising:
a first fire barrier element placed on a first component of a thrust reverser positioned on a first side of the engine, the first fire barrier element including a first sidewall with a first lower edge;
a second fire barrier element placed on a second component of the thrust reverser positioned on an opposing second side of the engine, the second fire barrier element including a second sidewall with a second lower edge; and
a third fire barrier element secured to and surrounding a mount structure for mounting the engine onto a pylon,
each of the elements arranged such that when the thrust reverser is in a closed position, the first fire barrier element, the second fire barrier element, and the third fire barrier element cooperate to form a firewall between the engine and the pylon, wherein the first sidewall and the second sidewall overlap the third fire barrier element and the first lower edge and the second lower edge contact a lower edge of the third fire barrier element.

20. The fire barrier system of claim 19, each of the elements arranged such that when the thrust reverser is in an open position, the first fire barrier element and the second fire barrier element are positioned to expose a portion of the pylon proximate the engine for inspection.

21. The fire barrier system of claim 19, wherein when the thrust reverser is in an open position, the first fire barrier element is separated from a first side of the third fire barrier element and the second fire barrier element is separated from an opposing second side of the third fire barrier element.

* * * * *